United States Patent
Sankaranarayanan et al.

(10) Patent No.: US 9,569,491 B2
(45) Date of Patent: Feb. 14, 2017

(54) MISO (MULTISTORE-ONLINE-TUNING) SYSTEM

(71) Applicant: NEC Laboratories America, Inc., Princeton, NJ (US)

(72) Inventors: Jagan Sankaranarayanan, Santa Clara, CA (US); Vahit Hacigumus, San Jose, CA (US); Jeffrey LeFevre, Santa Cruz, CA (US); Junichi Tatemura, Cupertino, CA (US)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 14/321,881

(22) Filed: Jul. 2, 2014

(65) Prior Publication Data
US 2016/0147832 A1     May 26, 2016

Related U.S. Application Data

(60) Provisional application No. 61/877,430, filed on Sep. 13, 2013, provisional application No. 61/877,423, filed on Sep. 13, 2013.

(51) Int. Cl.
*G06F 17/30*     (2006.01)

(52) U.S. Cl.
CPC ... *G06F 17/30457* (2013.01); *G06F 17/30339* (2013.01); *G06F 17/30383* (2013.01); *G06F 17/30598* (2013.01)

(58) Field of Classification Search
CPC .............. G06F 17/30224; G06F 17/30339; G06F 17/30598
See application file for complete search history.

(56) References Cited

U.S. PATENT DOCUMENTS

| | | | |
|---|---|---|---|
| 7,007,006 B2 * | 2/2006 | Zilio | G06F 17/30312 707/717 |
| 2014/0108861 A1 * | 4/2014 | Abadi | G06F 9/5066 714/11 |
| 2014/0114952 A1 * | 4/2014 | Robinson | G06F 17/30445 707/718 |
| 2014/0188947 A1 * | 7/2014 | Morris | G06F 17/30321 707/812 |
| 2014/0281345 A1 * | 9/2014 | Li | G06F 9/5016 711/171 |
| 2015/0058903 A1 * | 2/2015 | Iyengar | H04N 21/25841 725/93 |

OTHER PUBLICATIONS

N. Bruno and S. Chaudhuri, Automatic Physical Database Tuning: A Relaxation-based Approach, Jun. 16, 2005, pp. 227-238.*

(Continued)

*Primary Examiner* — Robert Beausoliel, Jr.
*Assistant Examiner* — Hau H Hoang
(74) *Attorney, Agent, or Firm* — Joseph Kolodka

(57) ABSTRACT

A system includes first and second data stores, each store having a set of materialized views of the base data and the views comprise a multistore physical design; an execution layer coupled to the data stores; a query optimizer coupled to the execution layer; and a tuner coupled to the query optimizer and the execution layer, wherein the tuner determines a placement of the materialized views across the stores to improve workload performance upon considering each store's view storage budget and a transfer budget when moving views across the stores.

16 Claims, 8 Drawing Sheets

(56) References Cited

OTHER PUBLICATIONS

S. Agrawal, S. Chaudhuri and V. Narasayya, Automated Selection of Materialized Views and Indexes for SQL Databases, 2000, Proceedings of the 26th International Conference on Very Large Datbases, Cairo, Egypt, pp. 496-505.*

M. Akdere and U. Cetintemel, Learning-based Query Performance Modeling and Prediction, Jan. 2011, pp. 1-12.*

V. Boyer, D. El Baz and M. Elkihel, Solution of Multidimensional Knapsack Problem via Cooperation of Dynamic Programming and Branch and Bound, 2010, pp. 1-8.*

* cited by examiner

MISO (MULTISTORE-ONLINE-TUNING) SYSTEM

The present application claims priority to Provisional Applications 61/877,423 and 61/877,430, both filed on Sep. 13, 2013, the contents of which are incorporated by reference.

BACKGROUND

Multistore systems represent a natural evolution for big data analytics, where query processing may span both stores, transferring data and computation. One approach to multistore processing is to transfer and load all of the big data into the RDBMS (i.e., up-front data loading) in order to take advantage of its superior query processing performance relative to the big data store. However, the large size of big data and the high cost of an ETL process (Extract-Transform-Load) may make this approach impractical. Another approach is to utilize both stores during query processing by enabling a query to transfer data on-the-fly (i.e., on-demand data loading). However, this results in redundant work if the big data workload has some overlap across queries, as the same data may be repeatedly transferred between the stores. A more effective strategy for multistore processing is to make a tradeoff between up-front and on-demand data loading. This is challenging since exploratory queries are ad-hoc in nature and the relevant data is changing over time. A crucial problem for a multistore system is determining what data to materialize in which store at what time. We refer to this problem as tuning the physical design of a multistore system.

On a parallel note, multistore systems utilize multiple distinct data stores such as Hadoop's HDFS and an RDBMS for query processing by allowing a query to access data and computation in both stores. Current approaches to multistore query processing fail to achieve the full potential benefits of utilizing both systems due to the high cost of data movement and loading between the stores. Tuning the multistore physical design, i.e., deciding what data resides in which store, can reduce the amount of data movement during query processing, which is crucial for good multistore performance. Because the stores have very asymmetric performance properties, the data placement problem is not straightforward. Roughly speaking, store 1 is large and slow relative to store 2, which is smaller and faster. Specifically there are 2 issues: Store 1 has worse query processing performance but provides much better data loading times, and Store 2 has better query processing performance but suffers from very high data load times. These issues require understanding the tradeoffs when considering which data to place in which store.

SUMMARY

In a first aspect, one approach termed MISO (MultIStore-Online-tuning) speeds up big data query processing by selecting the best set of materialized views for each store. MISO maximizes the utilization of the existing RDBMS resources, employing some of its spare capacity for processing big data queries. Specifically, the physical design of a Multistore system has two decision components: the data to materialize (i.e., which views), and where to materialize the data (i.e., which store). Moreover, both of these decisions are not be made in isolation.

Advantages of the above aspect may include one or more of the following. Our approach is both adaptive and lightweight with the following unique combination of features:
1) Our solution works online. The assumed workload is ad-hoc since analysts continue posing and revising queries. The Multistore design automatically adapts as the workload changes dynamically.
2) It uses materialized views as the basic element of physical design. The benefits of utilizing materialized views are that views encapsulate prior computation, and the placement of views across the stores can obviate the need to do costly data movement on-the-fly during query processing. Having the right views in the right store at the right time creates beneficial physical designs for the stores.
3) Our approach relies solely on the by-products of query processing. Query processing using HDFS (e.g., Hadoop jobs) materializes intermediate results for fault-tolerance. Similarly, query processing in Multistore systems moves intermediate results between the stores. In both cases, we treat these intermediate results as opportunistic materialized views and they are retained rather than discarded after the query completes. These views are beneficial for tuning the physical design since they represent the current set of relevant data, as determined by the workload. Note that the methods developed here are also applicable when the views are not created for free as a by-product of query execution as described here but are rather created for the explicit purpose of speeding up future queries.
4) Our method is adaptive and lightweight, and works in an online fashion utilizing only the by-products of query processing. Our method improves ad-hoc big data analytical processing on a multistore system up to 3:1× compared to multistore query processing without tuning.

In a second aspect, a method utilizes the by-products of query processing in a multistore system to tune the physical design of the multistore system. These by-products are materializations of intermediate data, which are then placed across the stores by the method. The by-products are termed "views" over the base data. In order to place the views across the stores in a way that is beneficial to query processing, an expected query workload is required. The method considers the recently observed queries as indicative of the future query workload. It then computes a benefit score for each view based on this predicted future workload of queries. Each store has an allotted view storage budget, and there is a view transfer budget for transferring views between the stores. Each budget may have a unique value. This setup is depicted in FIG. 2 in the paper. The method then considers transferring views between the stores such that the final view placements fit within all of the budgets and minimize the cost of the future workload. When computing solutions, the method considers a unified set of views, which is the union of all views present in each store. When it computes the solutions, the solutions include a subset of these views to be placed in each store. It first begins by solving the view placement for the high-performance store first, store 2. The views computed to be most beneficial for the future workload are considered for transfer to (or retained within) store 2. A solution is computed for store 2 and the solution is the set of views to place in store 2. The solution for store 2 must not exceed the view storage budget for store 2 and must not exceed the view transfer budget. It then similarly computes a solution for store 1. The solution for store 1 must not exceed the view storage budget for store 1 and must not exceed the remaining view transfer budget that was not consumed by the solution for store 2.

Advantages of the preferred embodiments may include one or more of the following. The method solves the data placement problem in a multistore system. The system results in faster query processing times for a multistore system. The system simply utilizes the 2 stores already in-place at many organizations. It couples them together in a way that reduces query execution time. By utilizing the already-existing resources (2 stores performing unrelated data processing tasks), the system makes better use of company resources. This has a monetary-cost benefit.

DESCRIPTION

Figure 1:
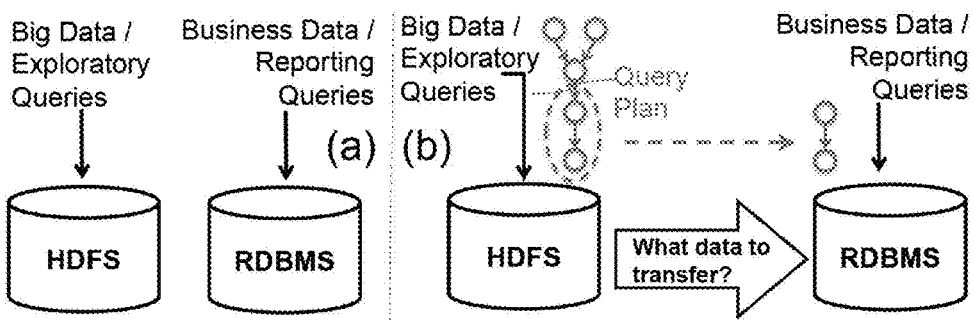
FIG. 1 shows an exemplary setup with (a) two independent stores and (b) multistore system utilizing both stores.

FIG. 1 shows an exemplary setup with (a) two independent stores and (b) multistore system utilizing both stores. Parallel relational database management systems (RDBMS) have long been the "work horse" storage and query processing engine of choice for data warehousing applications. Recently there has been a substantial move toward "Big Data" systems for massive data storage and analysis; HDFS with Hive is perhaps the most common example of such a system. The present system combines a parallel RDBMS and a big data store into a "multistore" system, either for performance reasons or for analysis of data sets that span both stores.

It is important to note that multistore as defined here does not necessarily denote a combination of a big data store and a RDBMS store. There can be some variability in the setup in the sense that multistore can involve more than two stores and can involve different combination of stores. In other words, multistores are not restricted to the combination of RDBMS and Hive. For instance, a multistore can be made up of a big data store, a column store and a RDBMS store. The techniques we developed here can be trivially extended to these alternative setups. Having noted that the concept of multistores, we describe a multistore consisting of Hive and RDBMS as a representative of a broader class of multistores for the ease of exposition.

The system runs MISO, a MultIStore Online tuning algorithm, to "soup up" big data query processing by tuning the set of materialized views in each store. MISO maximizes the utilization of the existing high-performance RDBMS resources, employing some of its spare capacity for processing big data queries. Given that the RDBMS holds business data that is very important to an organization, DBAs are naturally protective of RDBMS resources. To be sensitive to this concern, it is important that our approach achieves this speedup with little impact on the RDBMS reporting queries. MISO is an adaptive and lightweight method to tune data placement in a multistore system, and it has the following unique combination of features:

- It works online. The assumed workload is ad-hoc since analysts continue posing and revising queries. The multistore design automatically adapts as the workload changes dynamically.
- It uses materialized views as the basic element of physical design. The benefits of utilizing materialized views are that views encapsulate prior computation, and the placement of views across the stores can obviate the need to do costly data movement on-the-fly during query processing. Having the right views in the right store at the right time creates beneficial physical designs for the stores.
- It relies solely on the by-products of query processing. Query processing using HDFS (e.g., Hadoop jobs) materializes intermediate results for fault-tolerance. As noted before, although desirable it is not necessary that the views be restricted to only those that are produced as a by-product of query execution. The method also covers views that are explicitly materialized with the intention of speeding up future queries. In such cases there is a cost in materializing these views, which should be adjusted against their benefit. Similarly, query processing in multistore systems moves intermediate results between the stores. In both cases we treat these intermediate results as opportunistic materialized views, which can be strategically placed in the underlying stores to optimize the evaluation of subsequent queries. These views represent the current relevant data and provide a way to tune the physical design almost for free, without the need to issue separate costly requests to build materialized views.

FIG. 1 shows an exemplary Multistore System Architecture. In a multistore scenario there are two data stores, the big data store and the RDBMS. In our system, the big data store is Hive (HV) and the RDBMS is a commercial parallel data warehouse (DW) as depicted in FIG. 1. HV contains the big data log files, and DW contains analytical business data. While some multistore systems enable a single query to access data that spans both stores, MISO accelerates big data exploratory queries in HV by utilizing some limited spare capacity in DW and tuning the physical design of the stores for a workload of queries. In this way, MISO makes use of existing resources to benefit big data queries. With this approach, DW acts as an accelerator in order to improve the performance of queries in HV; later we show that MISO achieves this speedup with very little impact on DW.

Figure 2:
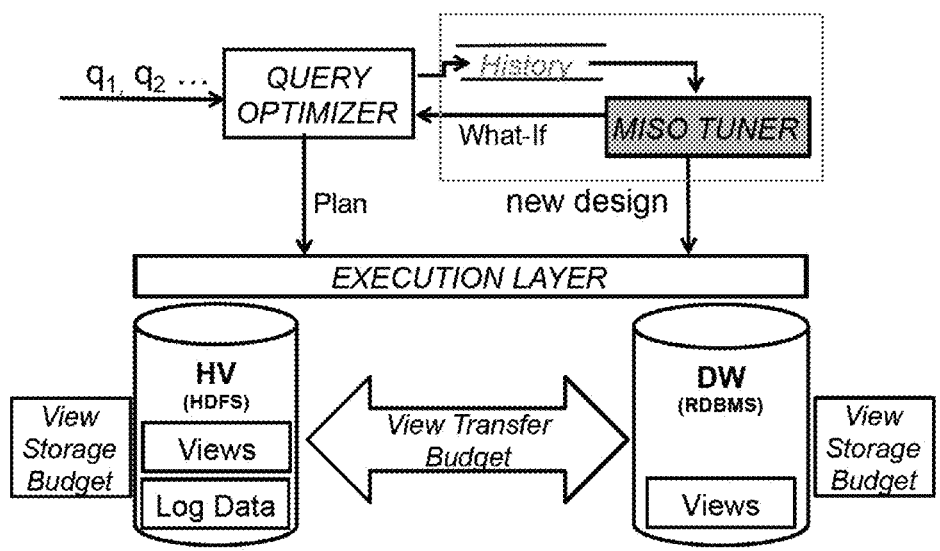
FIG. 2 depicts an exemplary system architecture, containing the MISO Tuner, the Query Optimizer, the Execution Layer, and the two stores HV and DW.

FIG. 2 depicts our system architecture, containing the MISO Tuner, the Query Optimizer, the Execution Layer, and the two stores HV and DW. In our system, each store resides on an independent cluster. HV contains log data while DW contains analytical data, but in this work our focus is on accelerating big data queries posed only on the log data. As indicated in the figure, each store has a set of materialized views of the base data (i.e., logs) stored in HV, and together these views comprise the multistore physical design.

For fault-tolerance, Hadoop-based systems (e.g., HV) materialize intermediate results during query execution, and we retain these by-products as opportunistic materialized views. On the other hand, DW products generally do not provide access to their intermediate materialized results. However, if those results become available, then they can also be used for tuning. In our system, we consider the class of opportunistic materialized views when tuning the physical design. It is MISO Tuner's job to determine the placement of these views across the stores to improve workload performance. When placing these views, each store has a view storage budget as indicated in the figure, and there is also a transfer budget when moving views across the stores. These budgets limit the total size of views that can be stored and transferred.

The primary data source in our system is large log files. Here we expect social media data drawn from sites such as Twitter, Foursquare, Instagram, Yelp, etc. This type of data is largely text-based with little structure. Logs are stored as flat HDFS files in HV in a text-based format such as json, xml, CSV or completely unstructured formats such as LOG4J files.

The input to the system is a stream of queries. The query language is HiveQL, which represents a subset of SQL implemented by Hive (HV). Queries are declarative and posed directly over the log data, such that the log schema of interest is specified within the query itself and is extracted during query execution. In HV, extracting flat data from text files is accomplished by a SerDe (serialize/deserialize) function that understands how to extract data fields from a particular flat file format (e.g., json). A query may contain both relational operations and arbitrary code denoting user-defined functions (UDFs). UDFs are arbitrary user code, which may be provided in several languages (e.g., Perl, Python); the UDFs are executed as Hadoop jobs in HV. Queries directly reference the logs and are written in HiveQL, the system automatically translates query sub-expressions to a DW-compliant query when executing query sub-expressions in DW. The processing location (DW or HV) is hidden from the end user, who has the impression of querying a single store.

The Execution Layer component is responsible for forwarding each component of the execution plan generated by the Query Optimizer to the appropriate store. A multistore execution plan may contain "split points", denoting a cut in the plan graph whereby data and computation is migrated from one store to the other. Since DW is used as a accelerator for HV queries, the splits in a plan move data and computation in one direction: from HV to DW. It is the multistore query optimizer's job (described next) to select the split points for the plan. As an example, the figure alongside has three panels, showing an execution plan (represented as a DAG) and then two possible split points indicated by the cuts. At each split point, the execution layer migrates the intermediate data (i.e., the working set corresponding to the output of the operators above the cut) and resumes executing the plan on the new store. Note that in the second panel, one intermediate data set needs to be migrated by the execution layer, while in the third panel two intermediate data sets need to be migrated. When intermediate data sets are migrated during query execution, they are stored in temporary DW table space (i.e., not catalogued) and discarded at the end of the query. The execution layer is also responsible for orchestrating the view movements when changes to the physical design are requested by the tuner. When views are migrated during tuning, they are stored in permanent DW table space and become part of the physical design until the next tuning phase.

The Multistore Query Optimizer component takes a query as input, and computes a multistore execution plan for query. The plan may span multiple stores, moving data and computation as needed, and utilizes the physical design of each store. The design of an optimizer that spans multiple stores must be based on common cost units (expected execution time) between stores, thus some unit normalization is required for each specific store. Our multistore cost function considers three components: the cost in HV, the cost to transfer the working set across the stores, and the cost in DW, expressed in normalized units. We performed experiments to calibrate each system's cost units to query execution time. As it turns out, when the necessary data for was present in DW, it was always faster to execute in DW by a very wide margin. Because the stores have very asymmetric performance, the HV units completely dominate the DW units, making a rough calibration/normalization of units sufficient for our purposes.

Because the choice of a split point affects query execution time, it is important to choose the right split points. The multistore query optimizer chooses the split points based on the logical execution plan and then delegates the resulting sub-plans to the store-specific optimizers. The store in which query sub-expressions are executed depends on the materialized views present in each store. Furthermore when determining split points the optimizer must also consider valid operations for each store, such as a UDF that can only be executed in HV. Moving a query sub-expression from one store to another is immediately beneficial only when the cost to transfer and load data from one store to another plus the cost of executing the sub-expression in the other store is less than continuing execution in the current store. Furthermore, due to the asymmetric performance between the stores we observed that when the data (views) required by the sub-expression was already present in DW, the execution cost of the sub-expression was always lower in DW. The primary challenge for the multistore query optimizer is determining the point in an execution plan at which the data size of a query's working set is "small enough" to transfer and load it into DW rather than continue executing in HV.

In our implementation, we have added a "what-if" mode to the optimizer, which can evaluate the cost of a multistore plan given a hypothetical physical design for each store. The optimizer uses the rewriting algorithm from [14] in order to evaluate hypothetical physical designs being considered by the MISO Tuner.

The MISO Tuner component is invoked periodically to reorganize the materialized views in each store based on the "latest traits" of the workload. The tuner examines several candidate designs and analyzes their benefit on a sliding window of recent queries (History in FIG. 1) using the what-if optimizer. The selected design is then forwarded to the execution layer, which then moves views from HV to DW and from DW to HV (indicated in FIG. 1) as per the newly computed design. The invocation of the MISO tuner, which we term a reorganization phase, can be time-based (e.g., every 1 h), query-based (e.g., every queries), activity-based (e.g., when the system is idle), or a combination of the above. In our system, reorganizations are query-based.

The View Transfer Budget is indicated by the arrow between the stores. This represents the total size of views in GB transferred between the stores during a reorganization phase and is provided as a constraint to the tuner. The HV View Storage Budget and the DW View Storage Budget are also indicated in the figure and similarly provided as constraints to the tuner. These represent the total storage allotted in GB for the views in each store. While DW represents a tightly-managed store, HV deployments are typically less tightly-managed and may have more spare capacity than DW. For these reasons, new opportunistic views created in HV between reconfigurations are retained until the next time the MISO tuner is invoked, while the set of views in DW is not altered except during reorganization phases. In any Hadoop configuration, there must be enough temporary storage space to retain these materializations during normal operation, we only propose to keep them a little while longer—until the next reorganization phase. Since the HV view storage budget is only enforced at tuning time, a few simple policies can be considered if the system has limited temporary space: Reorganizations could be done more frequently, a simple LRU policy could be applied to the temporary space, or a small percentage of the HV view storage budget could be reserved as additional temporary space.

The elements of our design are materialized views and the universe of views is denoted as V. The physical design of each store is denoted as $V_h$ for HV, and $V_d$ for DW, where $V_h, V_d \subseteq V$. The values $R_h, B_d$ denote the view storage budget constraints for HV and DW respectively, and the view transfer budget for a reorganization phase is denoted as $B_t$. As mentioned previously, reorganization phases occur periodically (e.g., after j queries are observed by the system), at which point views may be transferred between the stores. The constraints $B_h, R_d$, and $B_t$ are specified in GB.

Let $M = \langle V_h, V_d \rangle$ be a multistore design. M is a pair where the first component represents the views in HV, and the second component represents the views in DW. In this work we restrict the definition to include only two stores, but the definition may be extended to include addition stores in the more general case.

We denote the most recent n queries of the input stream as workload W. A query $q_i$ represents the $i^{th}$ query in W. The cost of a query q given multistore design M, denoted by cost(q,M), is the sum of the cost in HV, the cost to transfer the working set of q to DW and the cost in DW under a hypothetical design M. The evaluation metric we use for a multistore design M is the total workload cost, defined as:

$$TotalCost(W, M) = \sum_{i=1}^{n} cost(q_i, M). \quad (1)$$

Intuitively, this metric represents the sum of the total time to process all queries in the workload. This is a reasonable metric, although others are possible. Note that the metric does not include the reorganization constraint $B_t$ since it is provided as an input to the problem. The benefit of a view $v \in V$ for a q query is loosely defined as the change in cost of q evaluated with and without view v present in the multistore design. Formally, benefit(q,v)=cost(q, M∪v)−cost(q,M), where M∪v means that v is added to both stores in M.

For a query q, a pair of views (a,b) may interact with one another with respect to their benefit for q. The interaction occurs when the benefit of a for q changes when b is present. We employ the degree of interaction (doi) as defined in [19], which is a measure of the magnitude of the benefit change. Furthermore, the type of interaction for a view a with respect to b may be positive or negative. A positive interaction occurs when the benefit of a increases when b is present. Specifically, a and b are said to interact positively when the benefit of using both is higher than the sum of their individual benefits. In this case, we want to pack both a and b in the knapsack. A negative interaction occurs when the benefit of a decreases when b is present. As an example, suppose that either a or b can be used to answer q. Hence both are individually beneficial for q, but suppose that a offers slightly greater benefit. When both views are present, the optimizer will always prefer a and thus never use b, in which case the benefit of b becomes zero. In this case packing both a and b in the knapsack results in an inefficient use of the view storage budget. We will utilize both the doi and the type of interaction between views when formulating our solution later.

Multistore Design Problem.

Given an observed query stream, a multistore design $M = \langle V_h, V_d \rangle$, and a set of design constraints $B_h, B_d, B_t$, compute a new multistore design $M^{new} = \langle V_h^{new}, V_d^{new} \rangle$, where $V_h^{new}, V_d^{new} \subseteq V_h \cup V_d$, that satisfies the constraints and minimizes future workload cost.

TABLE 1

| MISO Tuner variables | |
| --- | --- |
| $V_h, V_d$ | Design of HV and DW before reorg |
| $V_{cands}$ | Candidate views for m-knapsack packing |
| $V_h^{new}, V_d^{new}$ | Design of HV and DW after reorg |
| $V_d^-$ | Views evicted from DW (=$V_d - V_d^{new}$) |
| $B_h, B_d, B_t$ | View storage and transfer budgets |
| $B_t^{rem}$ | Transfer budget remaining after DW design |
| sz(v), bn | Size and benefit of view $v \in V_{cands}$ |

One embodiment uses a heuristic approach in the way we handle view interactions and solve the physical design of both stores. In this section we motivate and develop our heuristics and then later in the experimental section we show that our approach results in significant benefits compared to simpler tuning approaches.

The workload we address is online in nature, hence reorganization is done periodically in order to tune the design to reflect the recent workload. Our approach is to obtain a good multistore design by periodically solving a static optimization problem where the workload is given. At each reorganization phase, the tuner computes a new multistore design $M^{new} = \langle V_h^{new}, V_d^{new} \rangle$ that minimizes total workload cost, as computed by our cost metric TotalCost (W,$M^{new}$). Note that minimizing the total workload cost here is equivalent to maximizing the benefit of $M^{new}$ for the representative workload W. The MISO Tuner algorithm is:

| Algorithm 1 MISO Tuner algorithm |
| --- |
| 1:   function MISO_TUNE($\langle V_h, V_d \rangle$, W, $B_h, B_d, B_t$) |
| 2:     V ← $V_h \cup V_d$ |
| 3:     P ← COMPUTEINTERACTINGSETS(V) |
| 4:     $V_{cands}$ ← SPARSIFYSETS(P) |
| 5:     $V_d^{new}$ ← M-KNAPSACK($V_{cands}, B_d, B_t$) |
| 6:     $B_t^{rem}$ ← $B_t - \Sigma_{v \in V_h \cap V_d^{new}} sx(v)$ |
| 7:     $V_h^{new}$ ← M-KNAPSACK($V_{cands} - V_d^{new}, B_h, B_t^{rem}$) |
| 8:     $M^{new}$ ← $\langle V_h^{new}, V_d^{new} \rangle$ |
| 9:     return $\mathcal{M}^{new}$ |
| 10:   end function |

The first two steps handle interactions between views as a pre-processing step before computing the new designs. The tuner algorithm begins by grouping all views in the current designs $V_h$ and $V_d$ into interacting sets. The goal of this step is to identify views that have strong positive or negative interactions with other views in V. At the end of this step, there are multiple sets of views, where views within a set strongly interact with each other, and views belonging to different sets do not. We sparsify each set by retaining some of the views and discarding the others. To sparsify a set, we consider if the nature of the interacting views within a set is positive or negative. If the nature of the interacting views is strongly positive, then as a heuristic, those views should always be considered together since they provide additional benefit when they are all present. Among those views, we treat them all as a single candidate. If the nature of the interacting views is strongly negative, those views should not be considered together for $M^{new}$ since there is little additional benefit when all of them are present. Among those views, we choose a representative view as a candidate and discard the rest. After the pre-processing step is complete, the resulting set of candidate views $V_{cands}$ ands contains views that may be considered independently when computing the new multistore design, which is done by solving two multidimensional knapsack problems in sequence. The dimensions of each knapsack are the storage budget and the transfer budget constraints. We solve an instance of a knapsack for DW, using view storage budget $B_d$ and view transfer budget $B_t$. The output of this step is the new DW design, $V_d^{new}$. Then we solve an instance of a knapsack for HV, using view storage budget $B_h$ and any view transfer budget remaining ($B_t^{rem}$) after solving the DW design. The output of this step is the new HV design, $V_h^{new}$. The reason we solve the DW design first is because it can offer superior execution performance when the right views are present. With a good DW design, query processing can migrate to DW sooner thus taking advantage of its query processing power. For this reason, we focus on DW design as the primary goal and solve this in the first phase. After the DW design is chosen, the HV design is solved in the second phase. In this two-phase approach, the design of HV and DW can be viewed as complimentary, yet formulated to give DW greater importance than HV as a heuristic.

Next, we describe our heuristic solution to consider view interactions since they can affect knapsack packing. For example if a view $v_a$ is already packed, and a view $v_b$ is added, then if an interaction exists between $v_a$ and $v_b$, the benefit of $v_a$ will change when $v_b$ is added. Our heuristic approach only considers the strongest interactions among views in V, producing a set of candidate views whereby we can treat each view's benefit as independent when solving the knapsack problems. This is because a dynamic programming formulation requires that the benefit of items already present in the knapsack does not change when a new item is added. We use a two-step approach to produce the candidate views $V_{cands}$ that will be used during knapsack packing, described below.

Before computing the interacting sets, we first compute the expected benefit of each view by utilizing the predicted future benefit function. The benefit function divides W into a series of non-overlapping epochs, each a fraction of the total length of W. This represents the recent query history. In this method, the predicted future benefit of each view is computed by applying a decay on the view's benefit per epoch—for each q∈W, the benefit of a view v for query q is weighted less as q appears farther in the past. The outcome of the computation is a smoothed averaging of v's benefit over multiple windows of the past. In this way, the benefit computation captures a longer workload history but prefers the recent history as more representative of the benefit for the immediate future workload.

To find the interacting sets, we produce a stable partition $P=\{P_1, P_2, \ldots, P_m\}$ of the candidate views V, meaning views within a part $P_i$ do not interact with views in another part $P_j$. In this method, the magnitude of the interaction (i.e., change in benefit) between views within each part $P_i$ is captured by doi. When computing doi, we slightly modify the computation to retain the sign of the benefit change, where the sign indicates if the interaction is positive or negative. For a pair of views that have both positive and negative interactions, the magnitude is the sum of the interactions, and the sign of the sum indicates if it is a net positive or negative interaction. The partitioning procedure preserves only the most significant view interactions, those with magnitude above some chosen threshold. The threshold has the effect of ignoring weak interactions. The value of the threshold is system and workload dependent, but should be sufficiently large enough to result in parts with a small number (e.g., 4 in our case) of views thus only retaining the strongest interactions.

Since the parts are non-overlapping (i.e., views do not interact across parts), each part may be considered independently when packing m-knapsack. This is because the benefit of a view in part $P_i$ is not affected by the benefit of any view in part $P_j$, where $P_i \neq P_j$. At this point however, some parts may have a cardinality greater than one, so we next describe a method to choose a representative view among views within the same part.

To sparsify the parts, we first take account of positively interacting views, then negatively interacting views. We exploit positive interactions by applying a heuristic to ensure that views that have a large positive interaction are packed together in the knapsack. Within each part, view pairs with positive interactions are "merged" into a single knapsack item, since they offer significant additional benefit when used together. The new item has a weight equal to the sum of the size of both views, and the benefit is the total benefit when both views are used together. This merge procedure is applied recursively to all positively interacting pairs within each part, in decreasing order of edge weight. Merging continues until there are no more positively interacting pairs of views within the part.

After applying the merge procedure, all parts with cardinality greater than 1 contain only strongly negative interacting views. Our next heuristic is to not pack these views together in the knapsack, but select one of them as a representative of the part. This is because packing these views together is an inefficient use of knapsack capacity. To choose the representative, we order items in the part by decreasing benefit per unit of weight and only retain the top item as a representative of the part. This greedy heuristic is commonly used for knapsack approaches to physical design and we use it here for choosing among those views with strong negative interactions within a part. The procedure is applied to each part until all parts have a single representative view. After these steps, the resultant partition P contains only singleton parts. These parts form $V_{cands}$ and are treated as independent by m-knapsack.

During each reorganization window, the MISO Tuner solves two instances of a 0-1 multidimensional knapsack problem (m-knapsack henceforward); the first instance for DW and the second instance for HV. Each instance is solved using a dynamic programming formulation. At the beginning of each reorganization window, note that $V_h$ includes all views added to the HV design by the MISO tuner during the previous reorganization window as well as any new opportunistic views in HV created since the last reorganization. During reorganization, the MISO tuner computes the new designs $V_h^{new}$ and $V_d^{new}$ for HV and DW respectively. Since the DW has better query performance, as a first heuristic MISO solves the DW instance first resulting in the best views being added to the DW design. Furthermore, we ensure $V_h \cap V_d = \emptyset$ to prevent duplicating views across the stores. Although this is also a heuristic, our rationale is it potentially results in a more "diverse" set of materialized views and hence better utilization of the limited storage budgets in preparation for an unknown future workload. If desired, this property could be relaxed by including all views in $V_{cands}$ when packing both HV and DW.

As an additional heuristic we do not limit the fraction of $B_t$ that can be consumed when solving the DW design in the first phase. Any remaining transfer budget $B_t^{rem}$ can then be used to transfer views evicted from DW to HV. This means that all of the transfer budget could potentially be consumed during the first phase when transferring views to DW. Alternatively, we could reserve a fraction of $B_t$ for transfers in each direction, although this too would be a heuristic.

In this phase, the target design is $V_d^{new}$, and the m-knapsack dimensions are $B_d$ and $B_t$. There are two cases to consider when packing DW. Views in HV ($V_h$) will consume the transfer budget $B_t$ (Case 1), while views in DW ($V_d$) will not (Case 2). The candidate views are $V_{cands}=V_h \cup V_d$. The variable k denotes the $k^{th}$ element in $V_{cands}$ (i.e., view $v_k$), the order of elements is irrelevant. The recurrence relation C is given by the following two cases.

Case 1: $v_k \in V_h$ applies when view $v_k$ is present in $HV$.

$C(k, B_d, B_t) =$ $$\begin{cases} C(k-1, B_d, B_t); & sz(v_k) > B_t \\ \max \begin{cases} C(k-1, B_d, B_t), \\ C\begin{pmatrix} k-1, B_d - sz(v_k), \\ B_t - sz(v_k) \end{pmatrix} + bn(v_k) \end{cases}; & sz(v_k) \, B_t, sz(v_k) \, B_d \end{cases}$$

In this case, either element k does not fit in $B_t$ (since $sz(v_k) > B_t$), and if so, skip element k and continue. Otherwise, k does fit in $B_t$ and $B_d$ (since $sz(v_k) \, B_t$ and $sz(v_k) \, B_d$), and if so take the max value of either (a) skip element k and continue, or (b) add element k to m-knapsack, subtract its size from $B_t$ and $B_d$, accumulate its benefit ($bn(v_k)$), and continue.

Case 2: $v_k \notin V_h$ applies when view $v_k$ is not in $HV$.

$C(k, B_d, B_t) =$ $$\begin{cases} C(k-1, B_d, B_t); & sz(v_k) > B_d \\ \max \begin{cases} C(k-1, B_d, B_t), \\ C(k-1, B_d - sz(v_k), B_t) + bn(v_k) \end{cases}; & sz(v_k) \, B_d \end{cases}$$

In this case, either element k does not fit in $B_d$ (since $sz(v_k) > B_d$), and if so, skip element k and continue. Otherwise, k does fit in $B_d$ (since $sz(v_k) \, B_d$), and if so take the max value of either (a) skip element k and continue, or (b) add element k to m-knapsack, subtract its size from $B_d$, accumulate its benefit ($bn(v_k)$), and continue. At the end of this first phase the design of DW, $V_d^{new}$, is complete.

In this phase, the target design is $V_h^{new}$, and the m-knapsack dimensions are $B_d$ and $B_t^{rem}$ and $V_d^-$ represents the views evicted from the DW which are now available for transfer back to HV. The solution is symmetric to Phase 1, with modified inputs. The value $B_t$ is initialized to $B_t^{rem}$. The candidate views are those remaining in $V_h$ and those evicted from DW ($V_d^-$); therefore $V_{cands}=(V_h \cup V_d)-V_d^{new}$. We similarly have 2 cases, defined in Phase 2 as:

Case 1: $v_k \in V_d^-$ applies when view $v_k$ was evicted from DW.
Case 2: $v_k \notin V_d^-$ applies when view $v_k$ was not evicted from DW.

As before, these cases indicate whether a view needs to be moved or not. The recurrence relations from Phase 1 can now be used with these modified cases.

The complexity of our knapsack approach is $$O\left(|V| \cdot \frac{B_t}{d} \cdot \frac{B_d}{d} + |V| \cdot \frac{B_t}{d} \cdot \frac{B_h}{d}\right),$$

where d represents the discretization factor (e.g., 1 GB). By discretizing the storage and transfer budgets, this approach can be made efficient in practice and suitable for our scenario that requires periodically recomputing new designs.

Figure 3:
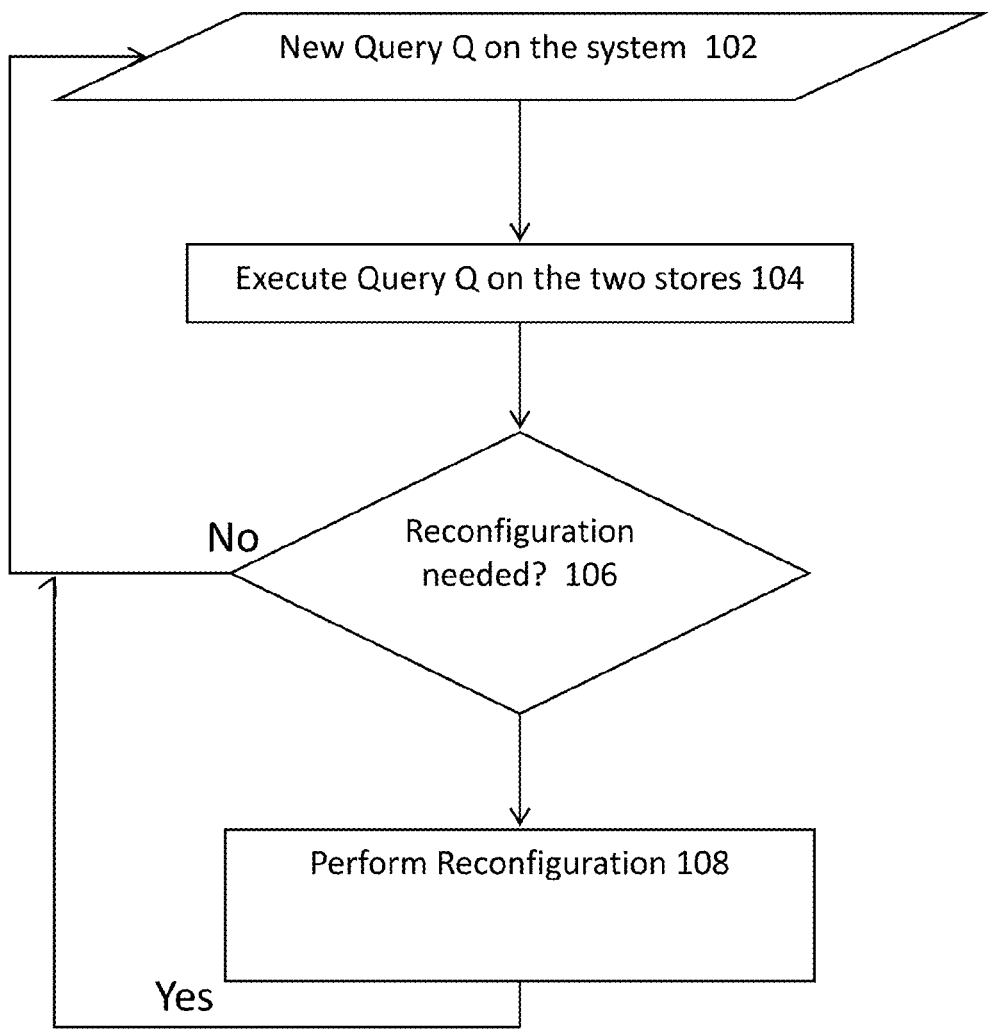
FIG. 3 shows an exemplary process to reconfigure a multistore system.

FIG. 3 shows an exemplary process to reconfigure a multistore system. The process first receives a new query Q on the system (102). The process then executes the query Q on the two stores (104). Next, the process checks if reconfiguration is needed in 106. If not then the process loops back to 102 and otherwise the process performs reconfiguration in 108 and then loops back to 106.

Figure 4:
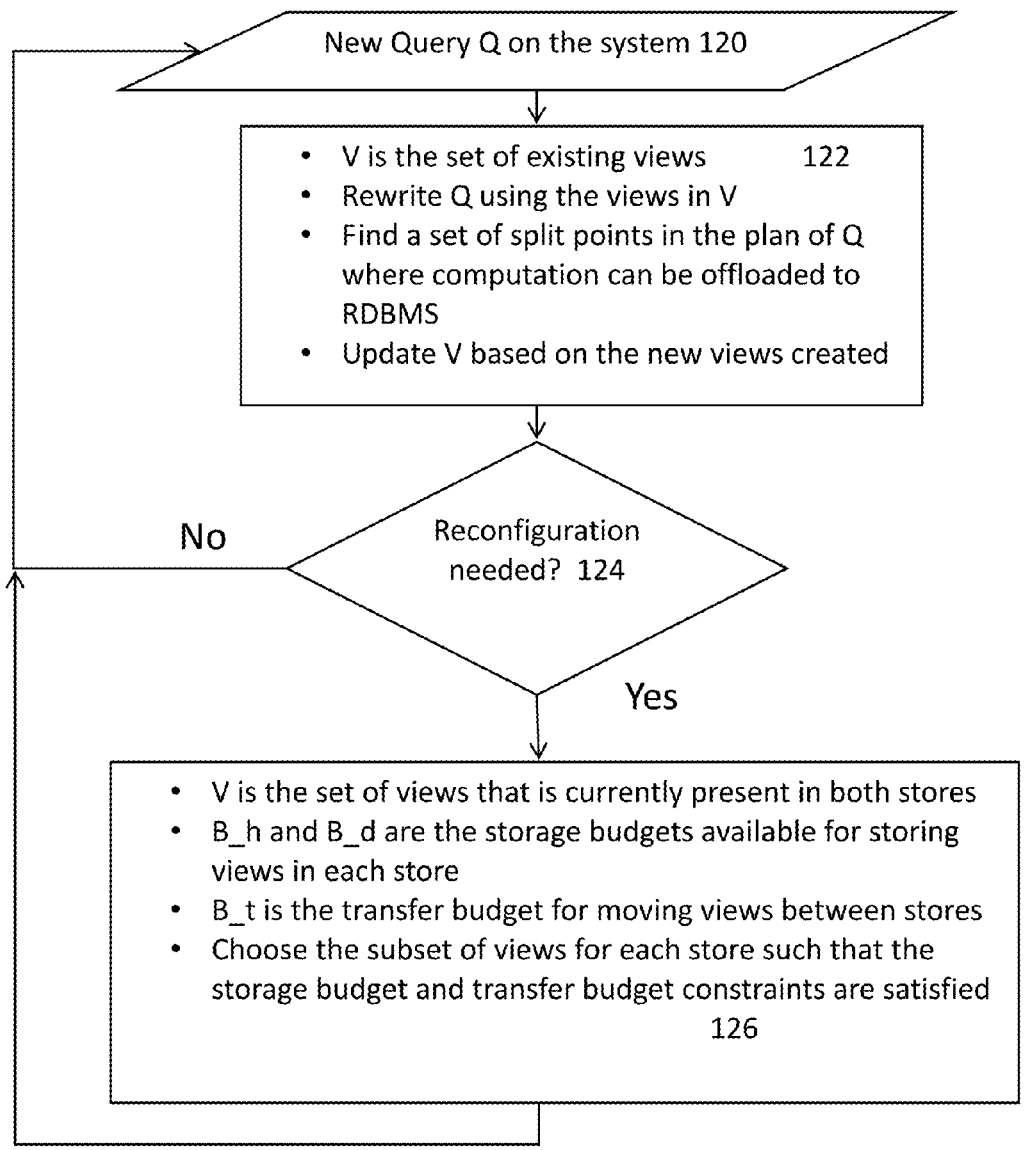
FIG. 4 shows another exemplary process to reconfigure a multistore system.

FIG. 4 shows another exemplary process to reconfigure a multistore system. In this system a new query is received by the system 120. Next in 120 V is a set of existing views; Q is rewritten using the views; and the system finds a set of split points in the plan of Q where computation can be offloaded to a relational database management system. The process then updates V based on the new views. From 122, the process proceeds to 124 where it checks whether reconfiguration is needed. If not the process loops back to 120. Otherwise the process moves to 126 where B_h and B_d are the set of views currently present in both stores, and B_t is the transfer budgets for moving between the stores. The process chooses the subset of views for each store such as the storage budget and transfer budget constraints are satisfied in 126.

Figure 5:
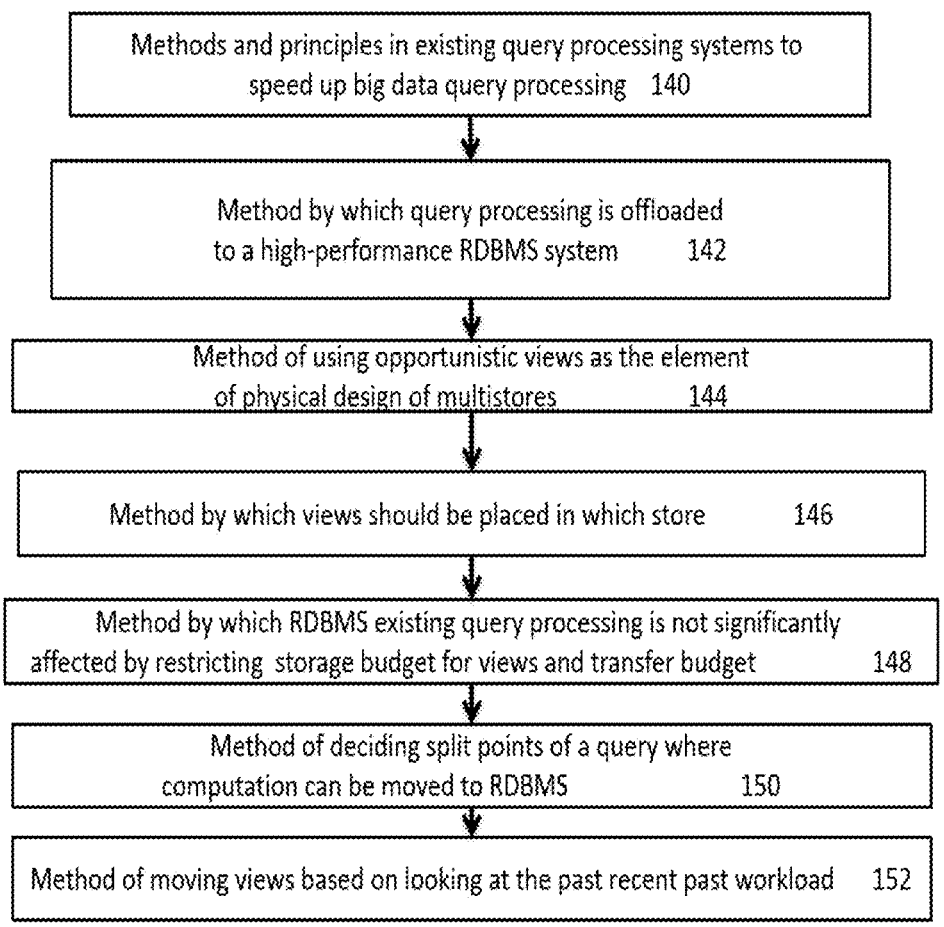
FIG. 5 shows exemplary processes for handling views as elements of multistores.

FIG. 5 shows exemplary processes for handling views as elements of multistores. The process includes methods that allow existing query processing systems to speed up big data query processing 140. The process also includes a method by which the query processing is offloaded to a high-performance relational data base management system 142. The process also includes a method of using opportunistic views as the element of physical design of multi-stores in 144. The process also includes a method to determine which views should be placed in a particular store in a predetermined order in 146. The process also includes a method by which the relational database management systems's existing query is not affected by restricting storage budget for views and transfer budget is done in 148. The process also includes a method of deciding split points of a query where the competition can be moved to the relational database management system 150. The process also includes a method of moving views based on looking at past recent workload in 152.

Figure 6:
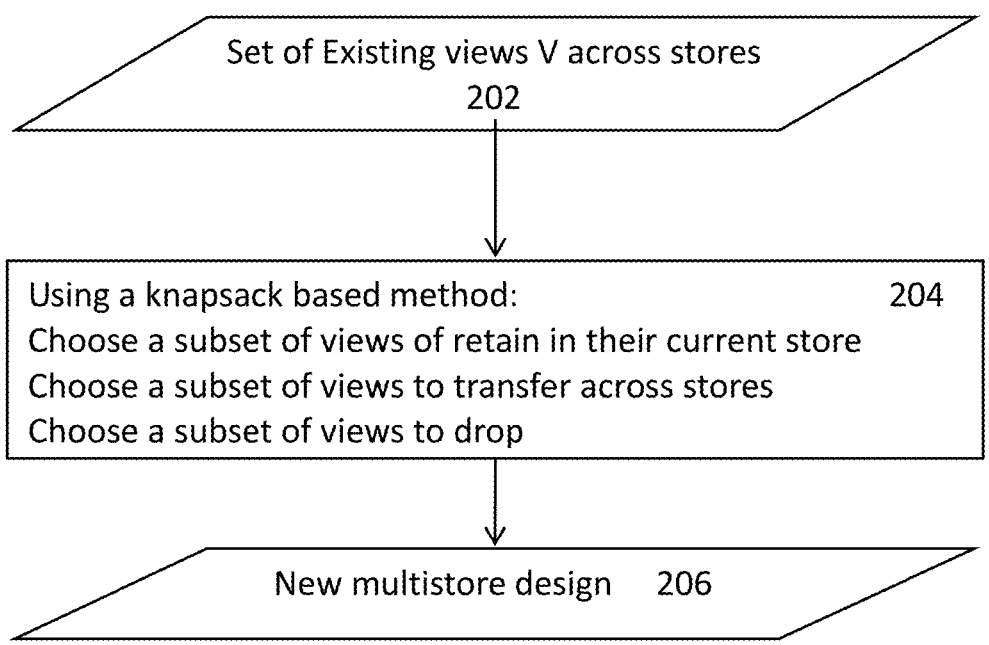
FIG. 6 shows an exemplary process to create a multi-store design.

FIG. 6 shows an exemplary process to create a multi-store design. The method receives a set of existing views V across the stores 202. Next, using knapsack-based method, the process chooses a subset of the views for retaining in the current store, a subset of views to transfer across the stores, and a subset of views to drop in 204. The process arrives at a new multi-store design in 206.

Figure 7:
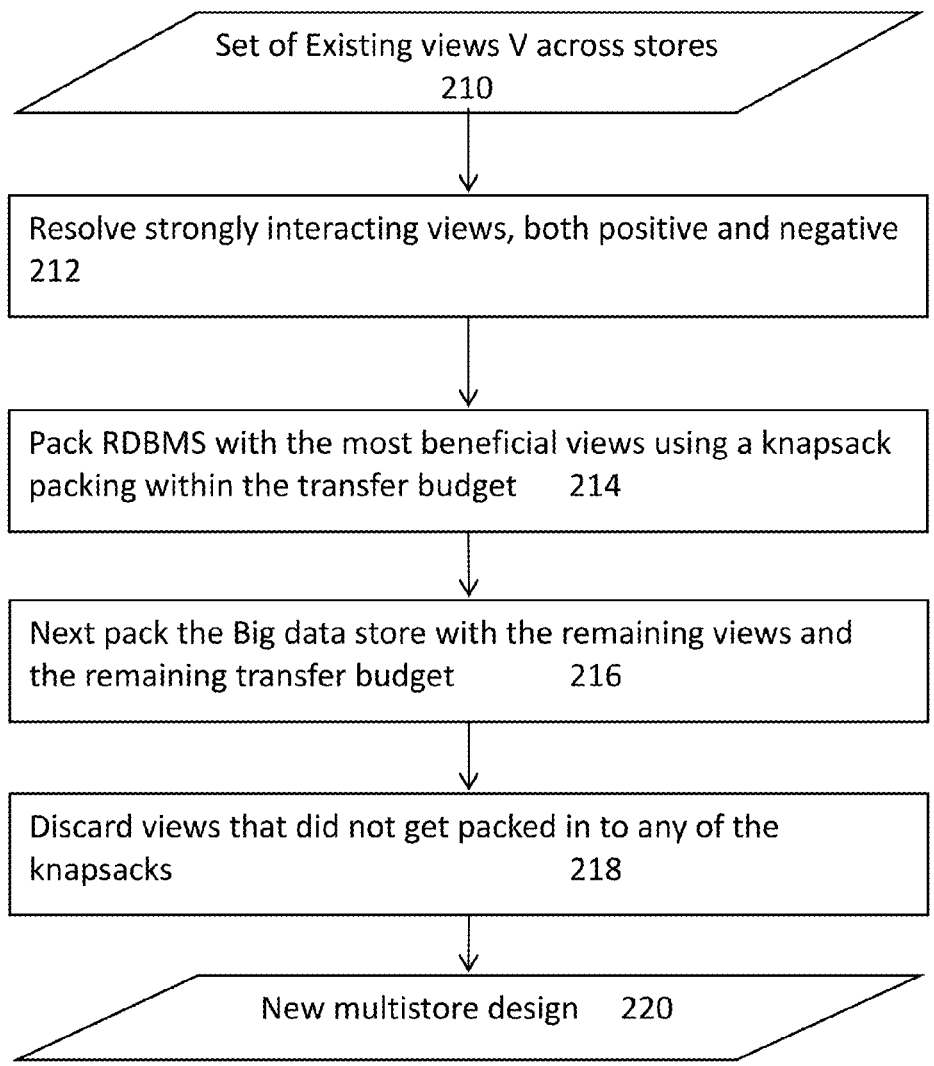
FIG. 7 shows in more details another exemplary process to create a multi-store design.

FIG. 7 shows in more details another exemplary process to create a multi-store design. In this process a set of existing views V is provided across the stores 210. The process resolves strongly interacting views, both positive and negative, in 212. Next the process packs the relational database management system with the most beneficial use using a knapsack packing within the transfer budget in 214. Next the process packs big data store with the remaining views and remaining transfer budget in 216. The process then discards views that did not get packing to any of the knapsacks in 218. The process then generates a new multi-store design in 220.

Figure 8:
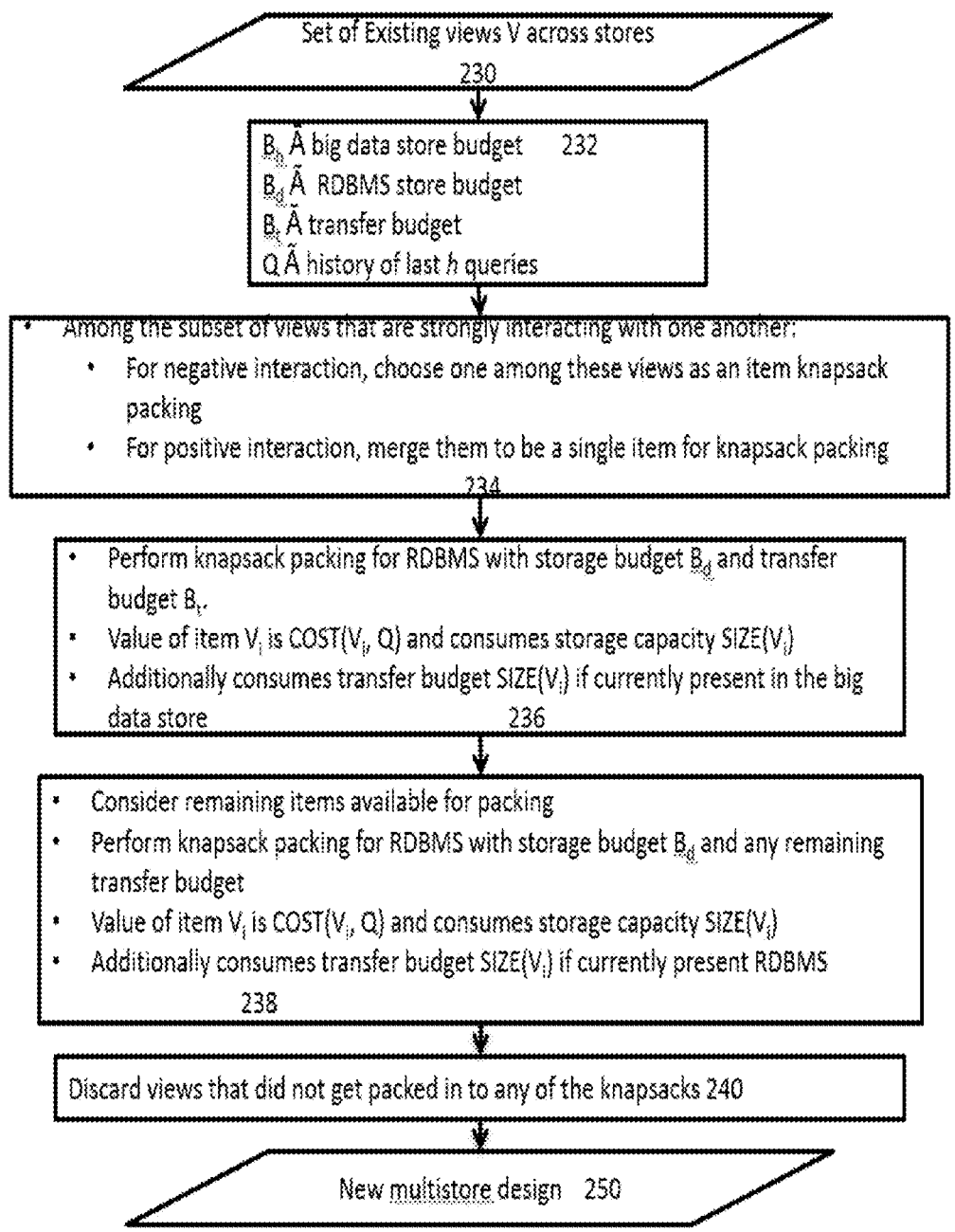
FIG. 8 shows in more details another exemplary process to create a multi-store design.

FIG. 8 shows in more details another exemplary process to create a multi-store design. First the process receives a set of existing views V across stores in 230. Next, the process updates budget and historical data in 232, for example big data store budget, RDBMS store budget, transfer budget, and history of last h queries. The process also performs the following:

In 234, among the subset of views that are strongly interacting with one another:
    For negative interaction, choose one among these views as an item knapsack packing
    For positive interaction, merge them to be a single item for knapsack packing In 236, the process performs:
    knapsack packing for RDBMS with storage budget $B_d$ and transfer budget $B_t$.
    Value of item $V_i$ is $COST(V_i, Q)$ and consumes storage capacity $SIZE(V_i)$
    consumes transfer budget $SIZE(V_i)$ if currently present in the big data store In 238, the process then:
    Consider remaining items available for packing
    Perform knapsack packing for RDBMS with storage budget $B_d$ and any remaining transfer budget
    Value of item $V_i$ is $COST(V_i, Q)$ and consumes storage capacity $SIZE(V_i)$ Additionally consumes transfer budget $SIZE(V_i)$ if currently present RDBMS. The process then discards views that did not get packed in to any of the knapsacks in 240. The process then generates a new multi-store design in 250.

Figure 9:
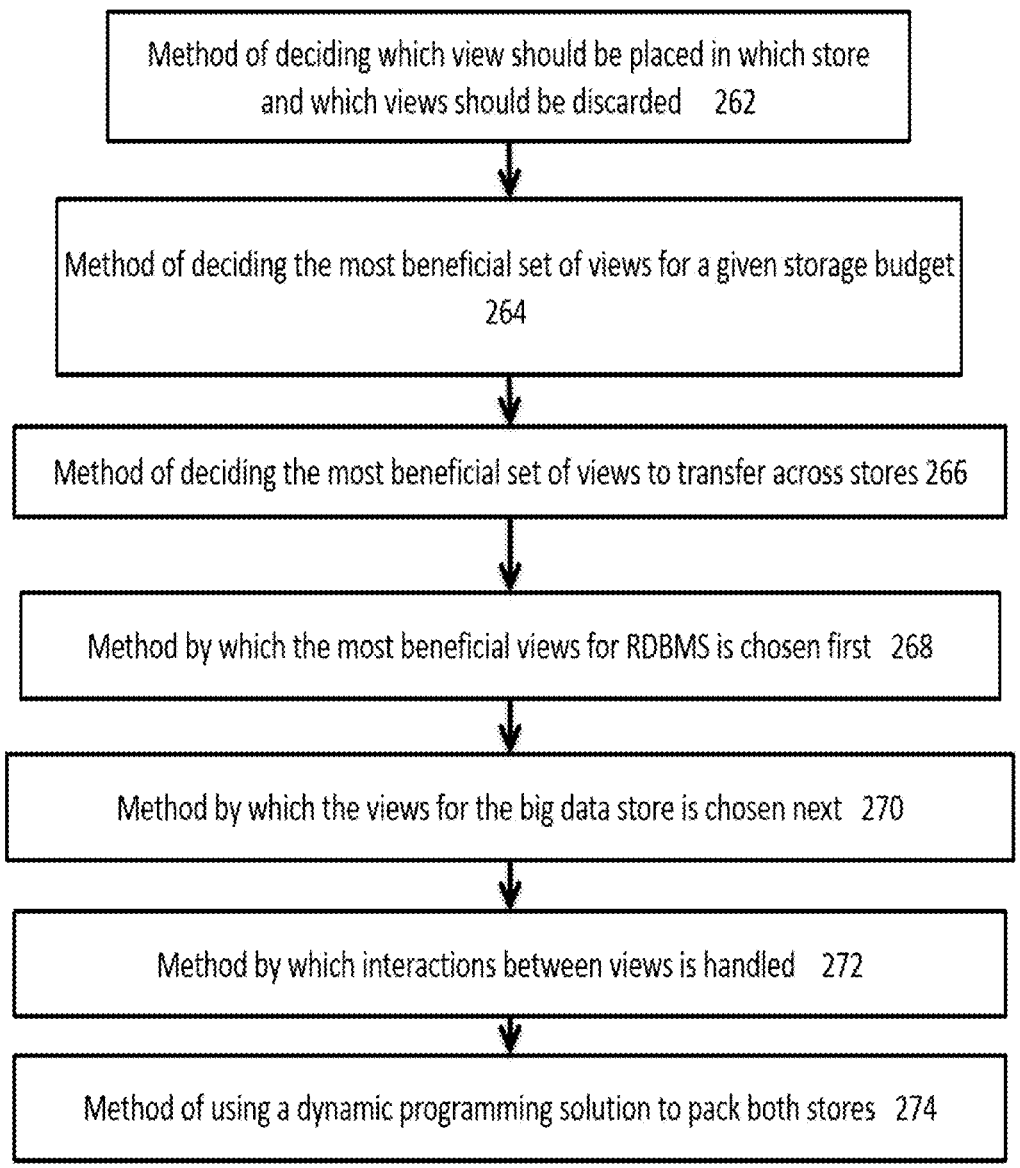
FIG. 9 shows methods used in a system for data base management.

FIG. 9 shows methods used in a system for data base management. The system includes a method of deciding which view should be placed in which store and which views should be discarded in 262. The process also includes a method of deciding the most beneficial set of views for a given storage budget in 264. The process also includes a method of deciding the most beneficial set of views to transfer across stores in 266. The process also includes a method by which the most beneficial views for RDBMS is chosen first in 268. The process also includes a method by which the views for the big data store is chosen next in 270. The process also includes a method by which interactions between views is handled in 272. The process also includes a method of using a dynamic programming solution to pack both stores in 274.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Those skilled in the art can now appreciate from the foregoing description that the broad teachings of the present invention can be implemented in a variety of forms. As can be appreciated, steps of methods disclosed and claimed can be performed in an order that is different than that described and claimed herein without departing from the spirit of the present invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system, comprising:
a processor;
a memory;
first and second data stores, each store having a set of materialized views of the base data and the views comprise a multistore physical design;
an execution layer coupled to the data stores;
a query optimizer coupled to the execution layer; and
a tuner coupled to the query optimizer and the execution layer, wherein the tuner determines a placement of the materialized views across the stores to improve workload performance upon considering each store's view storage budget and a transfer budget when moving views across the stores, wherein at each reorganization phase, the tuner generates a new multistore design $M^{new} = \langle V_h^{new}, V_d^{new} \rangle$ that minimizes a total workload cost $TotalCost(W, M^{new})$ by maximizing a benefit of a view for $M^{new}$ for a representative workload W, wherein the benefit of a view $v \in V$ for a query q is a change in cost of q evaluated with and without view v present in the multistore design and $benefit(q,v) = cost(q, M \cup v) - cost(q, M)$, where $M \cup v$ means that v is added to both stores in M, wherein the tuner includes code for:
grouping views in the current designs into interacting sets;
sparsifying a set based on interacting views within a set and if the interacting views are strongly positive, considering the views together as a single candidate;

choosing a representative view as a candidate and discard the rest and generating a set of candidate views that contain views to be considered independently when computing a new multistore design;

solving two multidimensional knapsack problems in sequence, wherein the dimensions of each knapsack include a storage budget and transfer budget constraints.

2. The system of claim 1, wherein the first and second data stores comprise a big data store and a relational database management system (RDBMS).

3. The system of claim 2, wherein the big data store is Hive (HV) and the RDBMS is a parallel data warehouse (DW).

4. The system of claim 1, comprising code for utilizing spare capacity in the DW and tuning a physical design of the stores for a workload of queries.

5. The system of claim 1, wherein each store has a set of materialized views of base data.

6. The system of claim 1, comprising code for:
receiving by-products of query processing in the multistore system, wherein the by-products include views or materializations of intermediate data;

placing the views or materializations across the stores based on recently observed queries as indicative of a future query workload;

determining a benefit score for each view based on a predicted future query workload, wherein each store has an allotted view storage budget, and there is a view transfer budget for transferring views between the stores; and tuning a physical design of the multistore system.

7. The system of claim 1, comprising code for transferring views between the stores to fit a final view placement within all of budgets and minimize a cost of the future query workload.

8. The system of claim 1, comprising code for computing a solution for a second store.

9. The system of claim 1, comprising code for determining a solution for the second store with a cost below a view storage budget for the high performance store and below remaining view transfer budgets not consumed by the solution for the high performance store.

10. The system of claim 1, comprising code for deciding which view should be placed in which store and which views should be discarded.

11. The system of claim 1, comprising code for deciding the most beneficial set of views for a given storage budget.

12. The system of claim 1, comprising code for sing deciding the most beneficial set of views to transfer across stores.

13. The system of claim 1, comprising code for selecting the most beneficial views for a RDBMS.

14. The system of claim 1, comprising code for determining which views for the big data store is chosen next.

15. The system of claim 1, comprising code for handling interactions between views.

16. The system of claim 1, comprising code for using a dynamic programming solution to pack both stores.

* * * * *